United States Patent
Agata et al.

(10) Patent No.: US 10,481,331 B2
(45) Date of Patent: Nov. 19, 2019

(54) REINFORCEMENT SLEEVE

(71) Applicant: FUJIKURA LTD., Tokyo (JP)

(72) Inventors: Katsushi Agata, Chiba (JP); Norihiro Momotsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/240,208

(22) Filed: Jan. 4, 2019

(65) Prior Publication Data

US 2019/0250331 A1  Aug. 15, 2019

(30) Foreign Application Priority Data

Feb. 13, 2018 (JP) ................................. 2018-023207

(51) Int. Cl.
G02B 6/25 (2006.01)
G02B 6/255 (2006.01)

(52) U.S. Cl.
CPC ......... *G02B 6/2558* (2013.01); *G02B 6/2551* (2013.01)

(58) Field of Classification Search
CPC ............................ G02B 6/2551; G02B 6/2558
USPC .......................................................... 385/96
See application file for complete search history.

(56) References Cited

U.S. PATENT DOCUMENTS

| 2007/0242420 A1 | 10/2007 | Hoshino et al. |
| 2012/0281951 A1 | 11/2012 | Takahashi et al. |
| 2017/0075067 A1* | 3/2017 | Filipowicz ........... G02B 6/2558 |
| 2018/0024294 A1 | 1/2018 | Wang et al. |

FOREIGN PATENT DOCUMENTS

| JP | H05201117 A | 8/1993 |
| JP | H1326677 A | 11/1999 |
| JP | 2009163165 A | 7/2009 |
| JP | 5607590 B2 | 10/2014 |
| JP | 2017529566 A | 10/2017 |
| WO | 2006061893 A1 | 6/2006 |
| WO | 2011087093 A1 | 7/2011 |
| WO | 2016033577 A1 | 3/2016 |

OTHER PUBLICATIONS

Office Action issued in corresponding Japanese Patent Application No. 2018-023207 dated Jan. 29, 2019 (3 pages).
Office Action issued in corresponding Japanese Patent Application No. 2018-023207 dated May 7, 2019 (3 pages).

* cited by examiner

*Primary Examiner* — Jerry M Blevins
(74) *Attorney, Agent, or Firm* — Osha Liang LLP

(57) ABSTRACT

A reinforcement sleeve for connecting a plurality of optical fibers to each other by fusion splice includes: a base member; a cover member that sandwiches a fusion splice portion of the plurality of optical fibers between the cover member and the base member; a first adhesive layer disposed between the base member and the plurality of optical fibers; and a second adhesive layer disposed between the cover member and the plurality of optical fibers. A width of the reinforcement sleeve is defined by a reinforcement sleeve standard relating to a reinforcement sleeve, and a height of the reinforcement sleeve is 1/n of a height defined by the reinforcement sleeve standard, where n is an integer equal to or larger than 2.

4 Claims, 4 Drawing Sheets

REINFORCEMENT SLEEVE

CROSS-REFERENCE TO RELATED APPLICATIONS

This application claims the benefit of priority from Japanese patent application No. 2018-023207, filed on Feb. 13, 2018, the disclosure of which is incorporated herein in its entirety by reference.

BACKGROUND

Field of the Invention

The present invention relates to a reinforcement sleeve, and more particularly to a reinforcement sleeve that reinforces a portion in which optical fibers are connected to each other by fusion splice.

Description of the Related Art

A housing that receives therein a connection structure or a branch structure for optical fibers, what is called a closure or a fiber distribution frame, may be used to interconnect optical fibers of optical fiber cables or branch an optical fiber of an optical fiber cable. Within such a housing, optical fibers are connected to each other by fusion splice. In order to protect such a fusion splice portion of optical fibers, the fusion splice portion is covered with a resin tube (reinforcement sleeve) (see, e.g., JP 5607590 B). Such a reinforcement sleeve is received and held within a sleeve reception portion provided in the housing.

Some standards have been defined for such reinforcement sleeves. Sleeve reception portions that hold a reinforcement sleeve have also been designed to conform to the standards of reinforcement sleeves. The number of optical fibers contained in one optical fiber cable tends to increase due to an increased optical communication capacity in these days. Since the dimension of reinforcement sleeves and sleeve reception portions is designed in accordance with the aforementioned standards, it is difficult to change the number of optical fibers held in one sleeve reception portion within an existing housing. Thus, there are limitations to increasing the number of optical fibers that can be held in an existing housing.

SUMMARY

One or more embodiments of the present invention provide a reinforcement sleeve capable of remarkably increasing the number of optical fibers that can be held in a housing.

According to one or more embodiments of the present invention, there is provided a reinforcement sleeve capable of remarkably increasing the number of optical fibers that can be held in a housing. The reinforcement sleeve is used for reinforcing a fusion splice portion in which a plurality of optical fibers are connected to each other by fusion splice. The reinforcement sleeve has a base member, a cover member that sandwiches the fusion splice portion of the plurality of optical fibers between the cover member and the base member, a first adhesive layer disposed between the base member and the plurality of optical fibers, and a second adhesive layer disposed between the cover member and the plurality of optical fibers. The first adhesive layer is held in intimate contact with the base member and the plurality of optical fibers. The second adhesive layer is held in intimate contact with the cover member and the plurality of optical fibers. The reinforcement sleeve has a width corresponding to a standardized width defined by a standard relating to a reinforcement sleeve and a height corresponding to 1/n of a standardized height defined by the standard where n is an integer equal to or larger than 2.

The above and other features of the present invention will be apparent from the following description when taken in conjunction with the accompanying drawings which illustrate some embodiments of the present invention by way of example.

DETAILED DESCRIPTION

Figure 1:
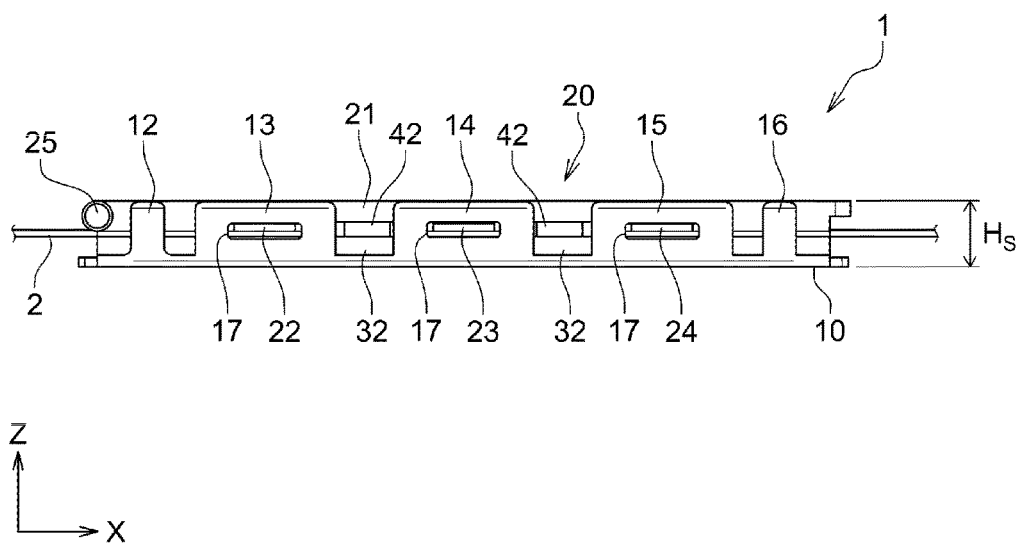
FIG. 1 is a front view showing a reinforcement sleeve along with optical fiber ribbons according to one or more embodiments of the present invention.

A reinforcement sleeve according to embodiments of the present invention will be described in detail below with reference to FIGS. 1 to 5. In FIGS. 1 to 5, the same or corresponding components are denoted by the same or corresponding reference numerals and will not be described below repetitively. Furthermore, in FIGS. 1 to 5, the scales or dimensions of components may be exaggerated, or some components may be omitted.

Figure 2:
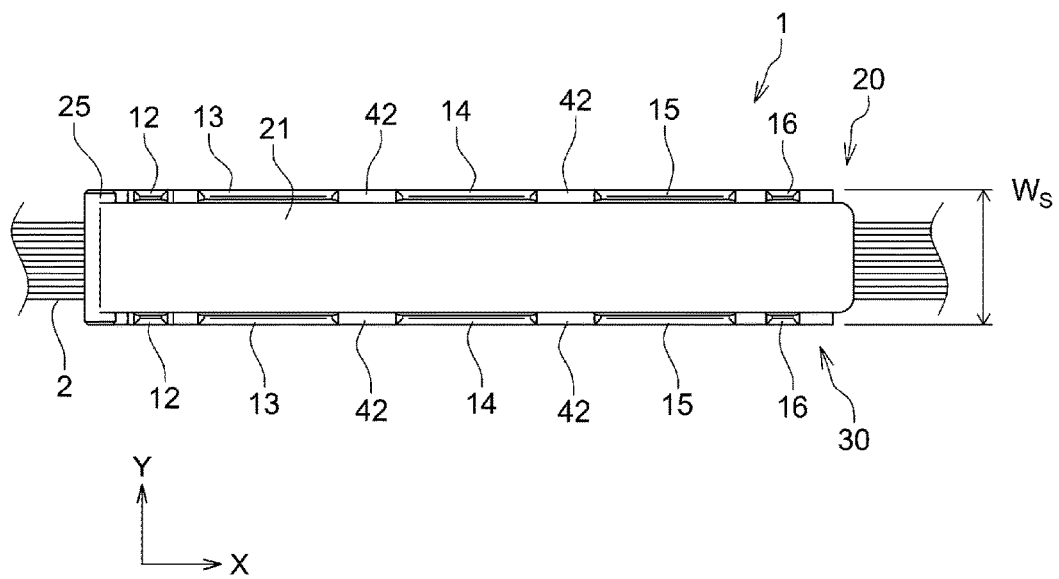
FIG. 2 is a plan view of the reinforcement sleeve shown in FIG. 1.
Figure 3:
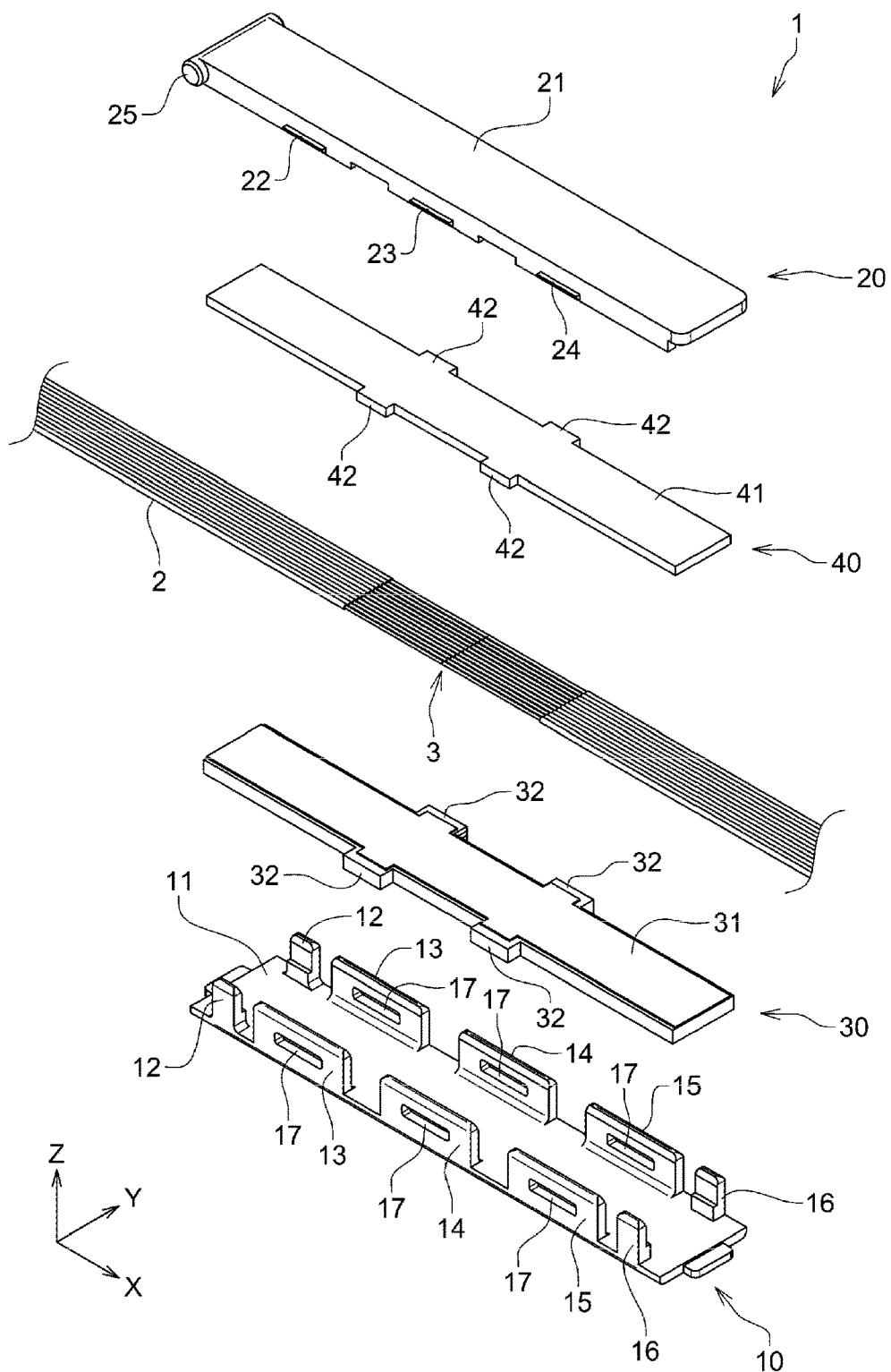
FIG. 3 is an exploded perspective view of the reinforcement sleeve shown in FIG. 1.

FIG. 1 is a front view showing a reinforcement sleeve 1 along with optical fiber ribbons 2 according to one or more embodiments of the present invention, FIG. 2 is a plan view thereof, and FIG. 3 is an exploded perspective view thereof. The reinforcement sleeve 1 of one or more embodiments is used to reinforce a fusion splice portion 3 (see FIG. 3) at which optical fibers of the optical fiber ribbons 2 are connected to each other by fusion splice. As shown in FIGS. 1 to 3, the reinforcement sleeve 1 generally has a shape of a rectangular parallelepiped. For example, 12-fiber ribbons can be used for the optical fiber ribbons 2. Nevertheless, the number of fibers in the optical fiber ribbons is not limited to this example. Furthermore, the form of optical fibers to be connected by fusion splice is not limited to optical fiber ribbons. One or more embodiments of the present invention are applicable to a case where a plurality of coated optical fibers are connected to each other by fusion splice and a case where a plurality of jacketed optical fibers are connected to each other by fusion splice.

The reinforcement sleeve 1 includes a base member 10, a cover member 20 for holding a fusion splice portion 3 of optical fiber ribbons 2 between the optical fiber ribbons 2 and the base member 10, a first adhesive layer 30 disposed between the base member 10 and the optical fiber ribbons 2, and a second adhesive layer 40 disposed between the cover member 20 and the optical fiber ribbons 2.

For example, the base member 10 is formed of polyphenylene sulfide resin. The base member 10 includes a base portion 11 in the form of a flat plate and five pairs of sidewalls 12-16 extending along the height direction (Z-direction) from opposite ends of the base portion 11 in the width direction (Y-direction). Each of the sidewalls 13-15 among those sidewalls 12-16 has an elongate hole (engagement hole) 17 formed therein.

For example, the cover member 20 is formed of polyphenylene sulfide resin. The cover member 20 includes a base portion 21 in the form of a flat plate, three pairs of protrusions 22-24 projecting from the base portion 21 in the width direction (Y-direction), and a hinge portion 25 provided at an end of the base portion 21 in the −X-direction. The dimension of the base portion 21 of the cover member 20 as measured in the width direction is slightly smaller than the distance between the sidewalls 12-16 of the base member 10. A distance between tips of the protrusions 22-24 as measured in the width direction is greater than the distance between the sidewalls 12-16 of the base member 10. With this configuration, when the reinforcement sleeve 1 is assembled, the base portion 21 of the cover member 20 is located between the sidewalls 12-16 of the base member 10, and the protrusions 22-24 of the cover member 20 engage with the elongate holes 17 of the sidewalls 13-15 of the base member 10, respectively.

A double-faced tape with high adhesion may be used for the first adhesive layer 30 and the second adhesive layer 40. The first adhesive layer 30 includes a base portion 31 disposed between the sidewalls 12-16 of the base member 10 and protrusions 32 extending along the Y-direction from the base portion 31. The protrusions 32 are disposed between the sidewalls 13 and the sidewalls 14 of the base member 10 and between the sidewalls 14 and the sidewalls 15 of the base member 10. The first adhesive layer 30 has an upper surface and a lower surface (a surface in the +Z-direction and a surface in the −Z-direction) having stickiness. Those surfaces are designed to adhere to the optical fiber ribbons 2 and the base member 10, respectively. The first adhesive layer 30 may be attached to the base member 10 in advance before the reinforcement sleeve 1 is assembled.

Furthermore, the second adhesive layer 40 includes a base portion 41 disposed between the sidewalls 12-16 of the base member 10 and protrusions 42 extending along the Y-direction from the base portion 41. The protrusions 42 are disposed between the sidewalls 13 and the sidewalls 14 of the base member 10 and between the sidewalls 14 and the sidewalls 15 of the base member 10. The second adhesive layer 40 has an upper surface and a lower surface (a surface in the +Z-direction and a surface in the −Z-direction) having stickiness. Those surfaces are designed to adhere to the cover member 20 and the optical fiber ribbons 2, respectively. The second adhesive layer 40 may be attached to the cover member 20 in advance before the reinforcement sleeve 1 is assembled.

When the reinforcement sleeve 1 is to be assembled, the fusion splice portion 3 of the optical fiber ribbons 2 is positioned between the base member 10 to which the first adhesive layer 30 has been attached and the cover member 20 to which the second adhesive layer 40 has been attached. The protrusions 22-24 of the cover member 20 are engaged with the elongate holes 17 of the sidewalls 13-15 of the base member 10 to attach the cover member 20 to the base member 10. At that time, the first adhesive layer 30 and the second adhesive layer 40 are pressed in the Z-direction. Each of the first adhesive layer 30 and the second adhesive layer 40 deforms so as to follow outer circumferential surfaces of the optical fibers of the optical fiber ribbons 2. Thus, the first adhesive layer 30 and the second adhesive layer 40 are brought into intimate contact with the outer circumferential surfaces of the optical fibers of the optical fiber ribbons 2. In this manner, the fusion splice portion 3 of the optical fiber ribbons 2 is sandwiched between the base member 10 and the cover member 20 of the reinforcement sleeve 1 and reinforced by the reinforcement sleeve 1. When the cover member 20 is attached to the base member 10, the protrusions 22-24 of the cover member 20 may be engaged with the elongate holes 17 of the sidewalls 13-15 of the base member 10 while the cover member 20 is rotated about the hinge portion 25 with respect to the base member 10.

Figure 4:
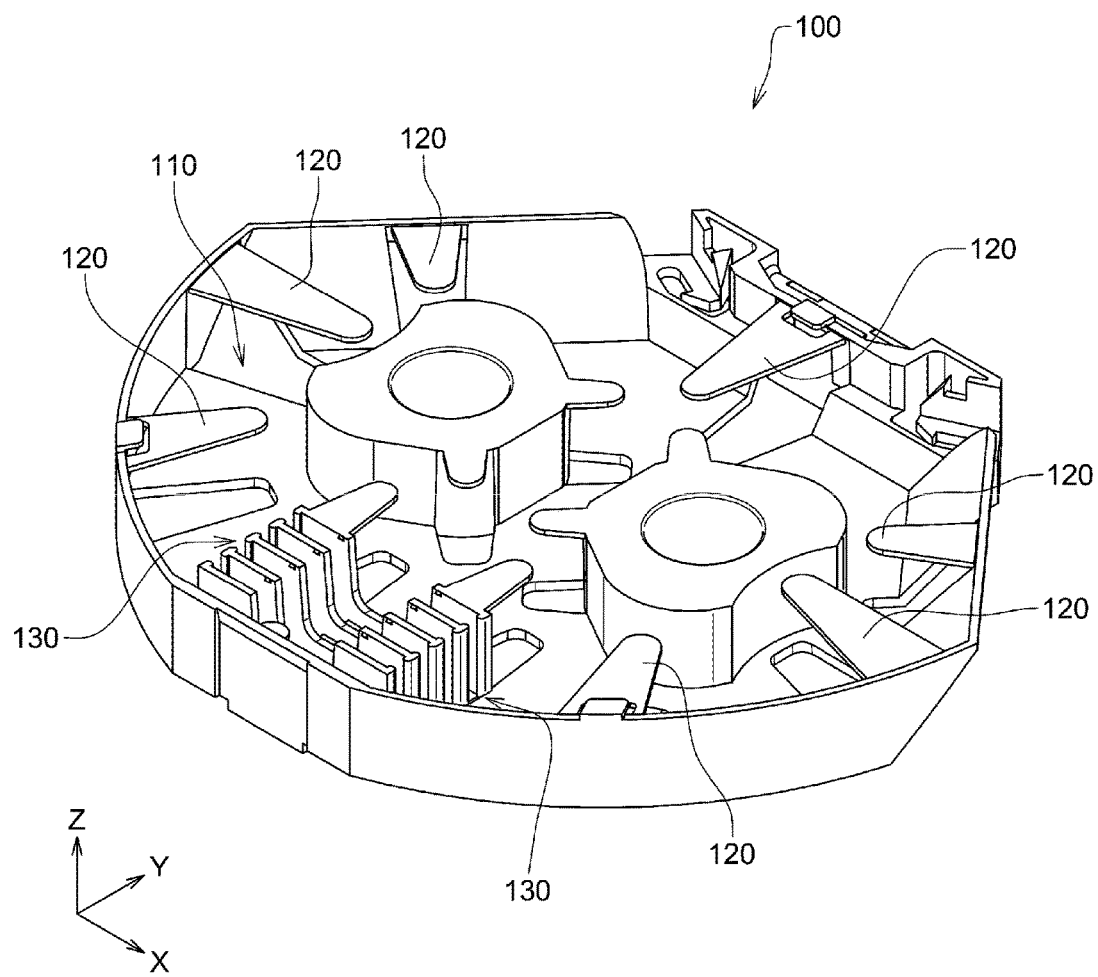
FIG. 4 is a perspective view showing an example of a fiber holder tray in accordance with one or more embodiments.
Figure 5:
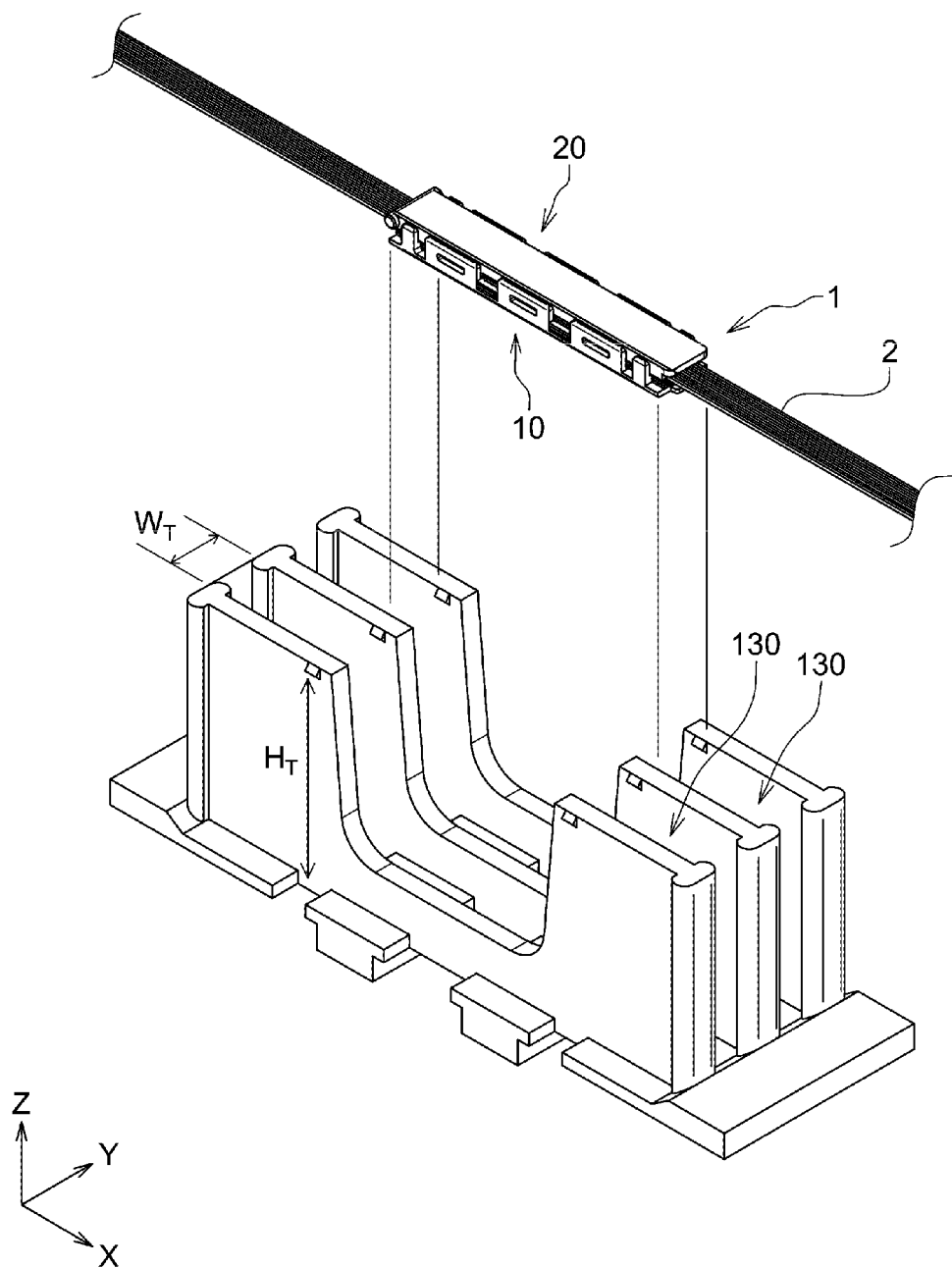
FIG. 5 is an enlarged perspective view showing part of the fiber holder tray along with a reinforcement sleeve according to one or more embodiments of the present invention.

FIG. 4 is a perspective view showing an example of a fiber holder tray 100 that has been heretofore received within a housing such as a closure or a fiber distribution frame, and FIG. 5 is an enlarged perspective view showing part of the fiber holder tray 100. The fiber holder tray 100 includes an excess fiber receiver 110 that receives the excess of optical fibers, a plurality of guide pieces 120 that guide optical fibers received in the excess fiber receiver 110, and sleeve reception portions 130 that receive a reinforcement sleeve for reinforcing a fusion splice portion of optical fibers.

In the example shown in FIG. 4, four sleeve reception portions 130 are arranged in the Y-direction. The dimension of each of the sleeve reception portions 130 is designed in accordance with the dimension defined by the standard relating to reinforcement sleeves (i.e., a reinforcement sleeve standard). For example, according to the IEC Standard 61756-1, the dimension of a reinforcement sleeve for 12 jacketed optical fibers or 12-fiber ribbon is defined with the width of 4.0 to 4.5 mm, the height of 4.5 to 4.8 mm, and the length of 45 mm. Therefore, for example, the width $W_T$ of each of the sleeve reception portions 130 is dimensioned such that the sleeve reception portion can receive a general reinforcement sleeve having a width of 4.0 to 4.5 mm. The height $H_T$ of each of the sleeve reception portions 130 is dimensioned such that three general reinforcement sleeves having a height of 4.5 to 4.8 mm can be stacked, for example, in the Z-direction.

In one or more embodiments, the width $W_s$ of the reinforcement sleeve 1 as measured along the Y-direction (see FIG. 2) is dimensioned (e.g., with 4.4 mm) so as to correspond to the standardized width (4.0 to 4.5 mm) defined by the aforementioned standard. Accordingly, as shown in FIG. 5, the reinforcement sleeve 1 according to one or more embodiments can be received into each of the sleeve reception portions 130 of the fiber holder tray 100.

Furthermore, the reinforcement sleeve 1 of one or more embodiments has a structure in which the optical fiber ribbons 2 are sandwiched between the base member 10 and the cover member 20 with the first adhesive layer 30 and the second adhesive layer 40. Therefore, the height of the reinforcement sleeve 1 as measured in the Z-direction can be made extremely small. Accordingly, the height Hs of the reinforcement sleeve 1 as measured in the Z-direction (see FIG. 1) can be dimensioned (e.g., with 2.3 mm) so as to correspond to a half of the standardized height (4.5 to 4.8 mm) defined by the aforementioned standard. Thus, while three conventional reinforcement sleeves can be stacked and received within the sleeve reception portion 130 in the Z-direction, use of the reinforcement sleeve 1 of one or more embodiments allows six reinforcement sleeves 1, which is twice as the number of conventional reinforcement sleeves, to be stacked and held in the Z-direction. In this manner, use of the reinforcement sleeve of one or more embodiments can remarkably increase the number of optical fibers that can be held within a housing, at low cost without any modification to the sleeve reception portion 130.

The above one or more embodiments describe an example in which the height $H_s$ of the reinforcement sleeve 1 as measured in the Z-direction is dimensioned so as to correspond to a half of the standardized height defined by the standard. Nevertheless, the height $H_s$ of the reinforcement sleeve 1 as measured in the Z-direction may be dimensioned so as to correspond to 1/n of the standardized height defined by the standard where n is an integer equal to or greater than 3. In such a case, the number of reinforcement sleeves 1 that can be held in the sleeve reception portion 130 of any existing housing can be n times the number of conventional reinforcement sleeves.

Furthermore, in the aforementioned one or more embodiments, the elongate holes (engagement holes) 17 are formed in the sidewalls 13-15 of the base member 10, and the protrusions 22-24 are formed on the cover member 20. However, in order to obtain the same effects, engagement holes may be formed in side surfaces of the cover member 20, and protrusions projecting inward in the Y-direction may be formed in the sidewalls of the base member 10. Moreover, although the IEC standard 61756-1 is described as an example of standards relating to reinforcement sleeves in the above one or more embodiments, the standards relating to reinforcement sleeves are not limited to this example.

Furthermore, the color of the base member 10 and/or the cover member 20 may be changed depending on the type of the optical fibers (optical fiber ribbons 2) held in the reinforcement sleeve 1 (e.g., single-mode fibers or multimode fibers) or the type of management or service (e.g., for power supply or for data communication). When the base member 10 and/or the cover member 20 is thus colored so as to distinguish optical fibers held in the reinforcement sleeve 1, an optical fiber of interest can readily be identified even if a plurality of reinforcement sleeves 1 held received in the sleeve reception portion 130 of the housing.

Moreover, optical fibers sandwiched between the cover member 20 and the base member 10 may be multilayered. Specifically, optical fibers to be sandwiched between the cover member 20 and the base member 10 may be divided into a first group of optical fibers and a second group of optical fibers. Then a third adhesive layer may be disposed between the first group of optical fibers and the second group of optical fibers. In this manner, the number of optical fibers that can be held in one reinforcement sleeve 1 can be increased. The third adhesive layer may be an adhesive layer similar to the first adhesive layer 30 and the second adhesive layer 40 or an adhesive layer of a different type than the first adhesive layer 30 and the second adhesive layer 40. Nevertheless, the third adhesive layer may be formed of a material having high adhesion.

In summary, according to one or more embodiments of the present invention, there is provided a reinforcement sleeve capable of remarkably increasing the number of optical fibers that can be held in a housing. The reinforcement sleeve is used for reinforcing a fusion splice portion in which a plurality of optical fibers are connected to each other by fusion splice. The reinforcement sleeve has a base member, a cover member that sandwiches the fusion splice portion of the plurality of optical fibers between the cover member and the base member, a first adhesive layer disposed between the base member and the plurality of optical fibers, and a second adhesive layer disposed between the cover member and the plurality of optical fibers. The first adhesive layer is held in intimate contact with the base member and the plurality of optical fibers. The second adhesive layer is held in intimate contact with the cover member and the plurality of optical fibers. The reinforcement sleeve has a width corresponding to a standardized width defined by a standard relating to a reinforcement sleeve and a height corresponding to 1/n of a standardized height defined by the standard where n is an integer equal to or larger than 2.

In this manner, a reinforcement sleeve according to one or more embodiments of the present invention has a structure in which a plurality of optical fibers are sandwiched between a base member and a cover member with a first adhesive layer and a second adhesive layer. Therefore, the height of the reinforcement sleeve can be made extremely smaller than that of conventional reinforcement sleeves. Accordingly, the height of the reinforcement sleeve can be reduced to a height corresponding to 1/n of the standardized height defined by standards relating to reinforcement sleeves. In this case, the number of reinforcement sleeves that can be held in a sleeve reception portion of any existing housing can be n times the number of conventional reinforcement sleeves. Thus, the number of optical fibers that can be held within a housing can remarkably be increased at low cost.

The base member may have sidewalls disposed on opposite ends thereof in a width direction so as to extend along a height direction. In this case, a protrusion projecting in the width direction may be formed on one of the cover member and the sidewalls of the base member. An engagement hole with which the protrusion can engage may be formed on the other of the cover member and the sidewalls of the base member. When the protrusion engages with the engagement hole, the first adhesive layer and the second adhesive layer are pressed in the height direction. Therefore, the first adhesive layer and the second adhesive layer deforms so as to follow outer circumferential surfaces of the optical fibers. Thus, the first adhesive layer and the second adhesive layer can be brought into intimate contact with the circumferential surfaces of the optical fibers.

At least one of the base member and the cover member may be colored with a color that allows the optical fibers sandwiched between the base member and the cover member to be distinguishable. When a plurality of reinforcement sleeves are received in a sleeve reception portion within a housing, this coloring allows an optical fiber of interest to be identified with ease.

The reinforcement sleeve may further include a third adhesive layer disposed between the first adhesive layer and the second adhesive layer. The plurality of optical fibers may include a first group of optical fiber disposed between the first adhesive layer and the third adhesive layer and a second group of optical fiber disposed between the second adhesive layer and the third adhesive layer. This configuration can increase the number of optical fibers that can be held in one reinforcement sleeve.

According to one or more embodiments of the present invention, the height of the reinforcement sleeve can be reduced to a height corresponding to 1/n of the standardized height defined by standards relating to reinforcement sleeves. Therefore, the number of reinforcement sleeves that can be held in a sleeve reception portion of any existing housing can be n times the number of conventional reinforcement sleeves. Thus, the number of optical fibers that can be received within a housing can remarkably be increased at low cost.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERALS AND SIGNS

1 Reinforcement sleeve
2 Optical fiber ribbon (optical fiber)

3 Fusion splice portion
10 Base member
11 Base portion
12-16 Sidewall
17 Elongate hole (engagement hole)
20 Cover member
21 Base portion
22-24 Protrusion
25 Hinge portion
30 First adhesive layer
31 Base portion
32 Protrusion
40 Second adhesive layer
41 Base portion
42 Protrusion
100 Fiber holder tray
110 Excess fiber receiver
120 Guide piece
130 Sleeve reception portion

What is claimed is:

1. A reinforcement sleeve for reinforcing a fusion splice portion of a plurality of optical fibers for connecting the plurality of optical fibers to each other by fusion splice, the reinforcement sleeve comprising:
   a base member;
   a cover member that sandwiches the fusion splice portion between the cover member and the base member;
   a first adhesive layer disposed between and in direct contact with the base member and the plurality of optical fibers; and
   a second adhesive layer disposed between and in direct contact with the cover member and the plurality of optical fibers, wherein
   a width of the reinforcement sleeve is defined by a reinforcement sleeve standard,
   a height of the reinforcement sleeve is 1/n of a height defined by the reinforcement sleeve standard, where n is an integer equal to or larger than 2,
   the base member has sidewalls disposed on opposite ends of the base member in a width direction of the base member so as to extend along a height direction of the base member,
   one of the cover member or the sidewalls comprises a protrusion projecting in the width direction, and
   the other one of the cover member or the sidewalls comprises an engagement hole that engages with the protrusion.

2. The reinforcement sleeve as recited in claim 1, wherein at least one of the base member or the cover member has a color different from a color of the optical fibers.

3. The reinforcement sleeve as recited in claim 2, further comprising
   a third adhesive layer disposed between the first adhesive layer and the second adhesive layer, wherein
   the plurality of optical fibers includes:
      a first group of optical fibers disposed between the first adhesive layer and the third adhesive layer; and
      a second group of optical fibers disposed between the second adhesive layer and the third adhesive layer.

4. The reinforcement sleeve as recited in claim 1, further comprising
   a third adhesive layer disposed between the first adhesive layer and the second adhesive layer, wherein
   the plurality of optical fibers includes:
      a first group of optical fibers disposed between the first adhesive layer and the third adhesive layer; and
      a second group of optical fibers disposed between the second adhesive layer and the third adhesive layer.

* * * * *